United States Patent
Dotan

[19]

[11] Patent Number: 5,907,994
[45] Date of Patent: Jun. 1, 1999

[54] GRILLING APPLIANCE

[75] Inventor: Simon Dotan, Natania, Israel

[73] Assignee: Ann Grant, New York, N.Y.; a part interest

[21] Appl. No.: 09/139,577

[22] Filed: Aug. 25, 1998

[51] Int. Cl.[6] .............................. A47J 37/00; A47J 37/04
[52] U.S. Cl. ................................ 99/332; 99/341; 99/390; 99/419; 99/421 V; 99/400; 99/446; 219/388; 219/389
[58] Field of Search .............................. 99/325, 331–333, 99/334–336, 337, 339, 340, 341, 352, 375, 390, 395, 397, 443 R, 400, 401, 419–421 V, 425–427, 444–446, 451, 447–450; 126/25 R, 9 R, 21 A; 219/400, 385, 218, 386, 392, 388, 389; 426/523; 392/416, 423, 425, 428

[56] References Cited

U.S. PATENT DOCUMENTS

| | | | |
|---|---|---|---|
| 1,612,252 | 12/1926 | Beverly | 99/421 V |
| 1,819,301 | 8/1931 | Noble | 99/419 |
| 1,993,353 | 3/1935 | Young | 99/337 |
| 2,581,570 | 1/1952 | Amanatides | 99/421 V |
| 2,687,080 | 8/1954 | Dorin | 99/332 |
| 2,897,776 | 8/1959 | Black et al. | 99/419 |
| 4,270,444 | 6/1981 | Geissmann | 99/421 P |
| 4,715,273 | 12/1987 | Riesselmann | 99/427 X |
| 4,810,856 | 3/1989 | Jovanovic | 219/401 |
| 5,106,642 | 4/1992 | Ciofalo | 426/523 X |
| 5,539,184 | 7/1996 | Su | 219/388 |
| 5,575,196 | 11/1996 | Masel et al. | 99/448 X |
| 5,665,258 | 9/1997 | Hsu | 219/386 X |

*Primary Examiner*—Timothy F. Simone
*Attorney, Agent, or Firm*—Benjamin J. Barish

[57] ABSTRACT

A grilling appliance includes a housing defining an internal grilling compartment for receiving a food article to be grilled; an impaling member mounted within the grilling compartment for impaling a food article to be grilled; a circular array of electrical heaters surrounding the impaling member for heating the food article impaled thereon. The impaling member is non-rotatably mounted to the housing within the grilling compartment, and the electrical heaters are sequentially energized to produce a rotating heating front which rotates around the impaling member to heat the article impaled thereon.

20 Claims, 2 Drawing Sheets

GRILLING APPLIANCE

FIELD AND BACKGROUND OF THE INVENTION

The present invention relates to grilling appliances such as used for grilling various types of food articles, e.g., chicken, beef, lamb, and the like.

The present invention is particularly applicable to grilling appliances of the type which include an impaling member mounted within a grilling compartment for impaling a food article to be grilled, and a circular array of electrical heaters surrounding the impaling member for heating the food article impaled thereon. This type of grilling appliance is illustrated, for example, in Austrian Patent No. 217592 of October 1961, and U.S. Pat. Nos. 5,575,196, 4,810,856, 4,715,273, 1,819,301 and 1,612,252. In such grilling appliances, the impaling member is generally rotated within the grilling compartment with respect to the electrical heaters to evenly grill the outer surface of the food article impaled on the impaling member.

Such grilling appliances, however, are relatively bulky and expensive to produce primarily because of the rotary drive for the impaling member. Such rotary drives generally include an electrical motor and a step-down transmission to rotate the impelling member at the desired slow speed.

OBJECTS AND BRIEF SUMMARY OF THE INVENTION

An object of the present invention is to provide a grilling appliance of the foregoing type which does not require a rotary drive and step-down transmission. Another object of the present invention is to provide a grilling appliance of the foregoing type which can be implemented in a very compact construction and which requires but a few simple parts that can be produced in volume and at low cost.

According to one aspect of the present invention, there is provided a grilling appliance comprising: a housing defining an internal grilling compartment for receiving a food article to be grilled; an impaling member mounted within the grilling compartment for impaling a food article to be grilled; a circular array of electrical heaters surrounding the impaling member for heating the food article impaled thereon; and an electrical supply system for energizing the electrical heaters; characterized in that: the impaling member is non-rotatably mounted to the housing within the grilling compartment; and the electrical supply system includes a heater control device which sequentially energizes the electrical heaters to produce a rotating heating front which rotates around the impaling member to heat the article impaled thereon.

Such a grilling appliance obviates the need for a rotary drive and step-down transmission for the impaling member, and can therefore be produced in a more compact construction and with a relatively few simple parts that can be manufactured and assembled in volume and at low cost.

According to further features in the described preferred embodiment, the heater control device sequentially energizes the electrical heaters according to preselected time intervals in which the energization time interval of each electrical heater overlaps the energization time interval of the next sequentially-energized electrical heater. In the described preferred embodiment, the heater control device includes a heat selector for selecting the heat intensity of the heating front produced by the electrical heaters by selecting the amount of the overlapping of the energization time intervals.

The heat control device also includes a rotational speed selector for selecting the speed of the rotating heat front by selecting the speed of sequential energization of the electrical heaters.

It will thus be seen that a grilling appliance including the foregoing features can be controlled by simple electrical switching devices which control the energization of the electrical heaters to produce any desired heat intensity as well as rotational speed of the heating front.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
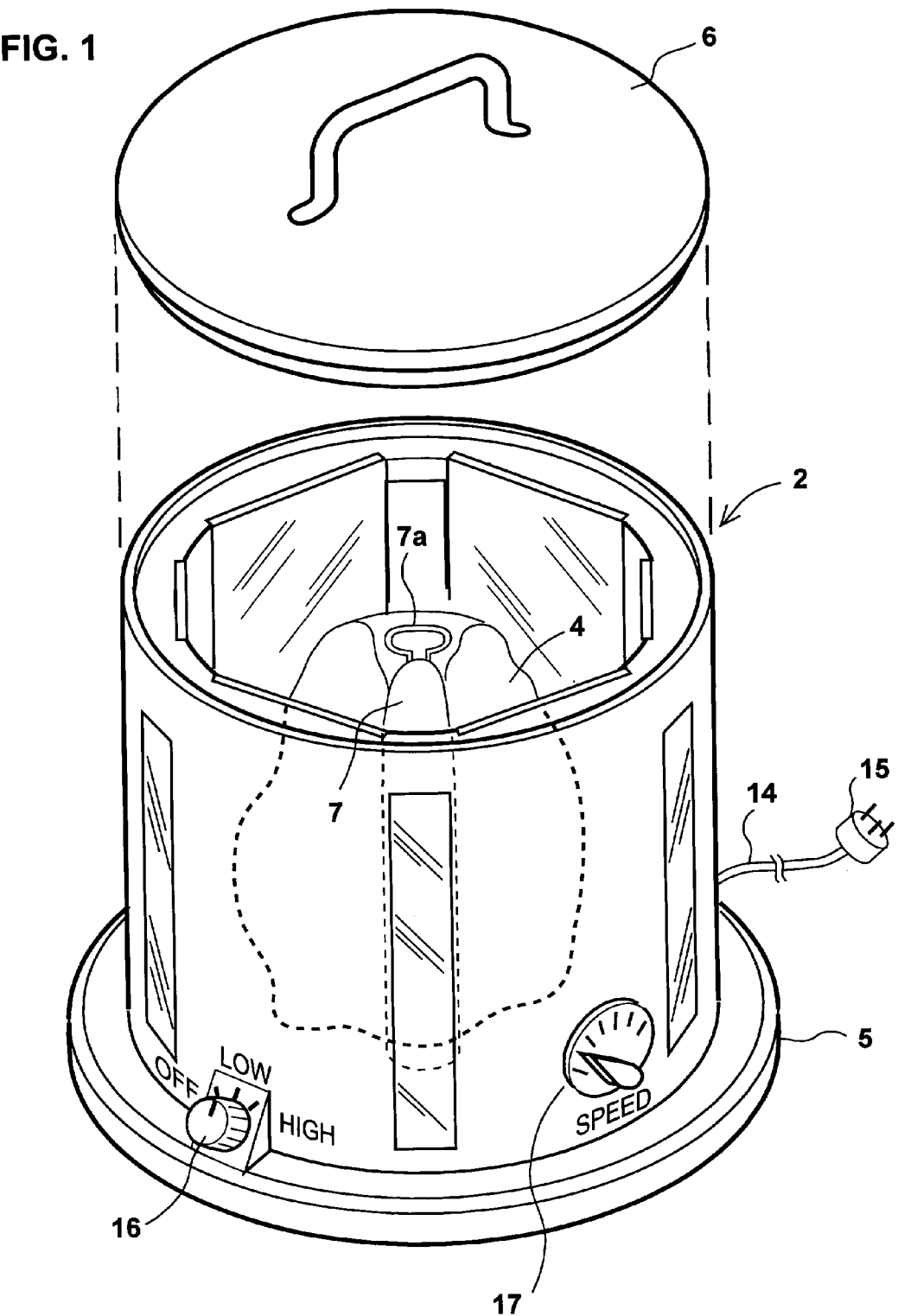
FIG. 1 is a perspective view illustrating one form of grilling appliance constructed in accordance with the present invention.

The grilling appliance illustrated in the drawings comprises a housing, generally designated 2, defining an internal grilling compartment 3 for receiving a food article 4, such as a chicken, to be grilled. Housing 2 includes a base 5 stably supporting the appliance on a flat horizontal surface. The upper end of the housing is closed by a removable cover 6, which is preferably transparent or includes a transparent window, to enable one to view the interior of the housing.

Figure 3:
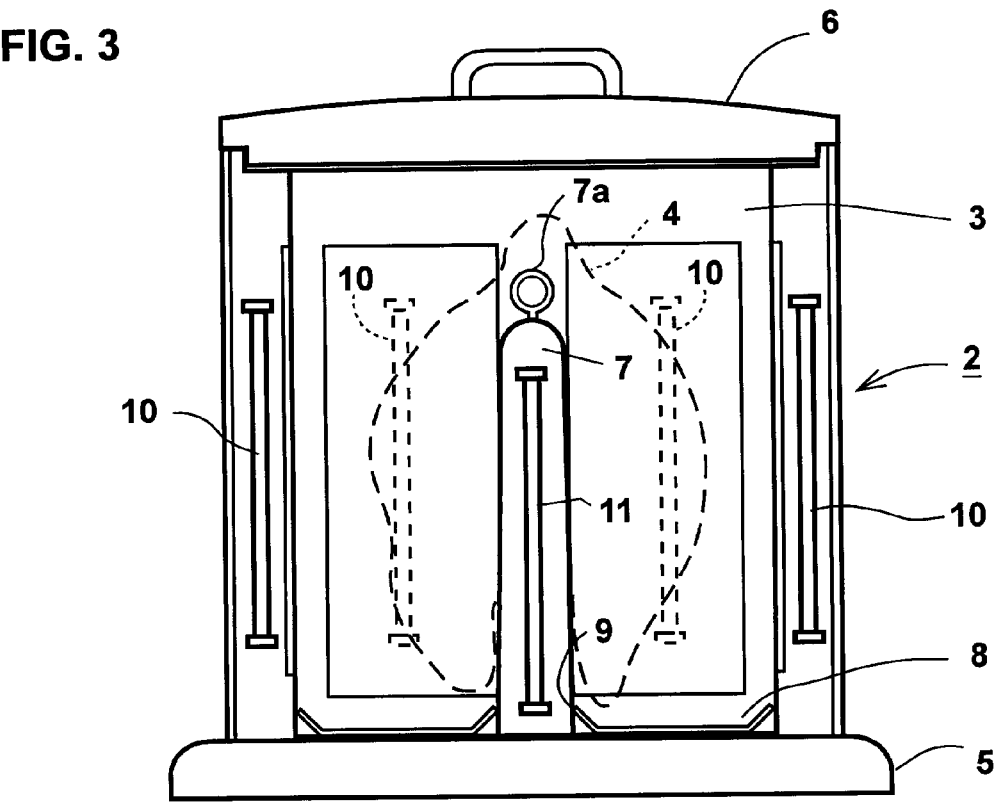
FIG. 3 is a side elevational view of the appliance of FIG. 1.

A vertical impaling member 7 is mounted within the grilling compartment 3 for impaling the food article 4 to be grilled. A horizontal drip pan 8 (FIG. 3) is removably mounted on base 5 at the bottom of the grilling compartment 3 for receiving drippings from the food article 4 as it is being grilled. Drip pan 8 is removable from the grilling compartment, and is formed with a central opening 9 for accommodating the vertical impaling member 7.

The food article 4 to be grilled is heated by a circular array of electrical heaters 10 surrounding the food article when impaled on the vertical impaling member 7. According to the preferred embodiment illustrated in FIGS. 1 and 2, each of the electrical heaters 10 is in the form of an elongated heater lamp extending vertically from the bottom of the grilling compartment 3 to a height slightly above that of the vertical impaling member 7 so as to apply sufficient heat to grill the food article. A further electrical heater 11, also in the form of a vertically-extending heater lamp, is disposed within the vertical impaling member 7 to heat the food article 4 from the impaling member, and thus to uniformly grill the complete food article.

In the conventional grilling appliance of this type such as described in some of the above-cited patents, the heat is uniformly distributed around the food article 4 being grilled by rotating the impaling member 7, and thereby rotating the food article 4 with respect to the electrical heaters 10. However, as briefly described above, such grilling appliances are relatively bulky and expensive to produce because of the need to provide a rotary drive motor for rotating the impaling member 7 and particularly the step-down transmission for stepping-down the relatively high rotary speed of the electrical motor to produce a relatively slow rotation of the food article 4 with respect to the electrical heaters 10.

According to the present invention, the vertical impaling member 7 is non-rotatably mounted with respect to housing 2, but instead, the circular array of electrical heaters 10 are controlled to produce a slowly-rotating heating front which rotates around the food article 4 carried by the impaling member 7 to evenly heat the food article.

Figure 2:
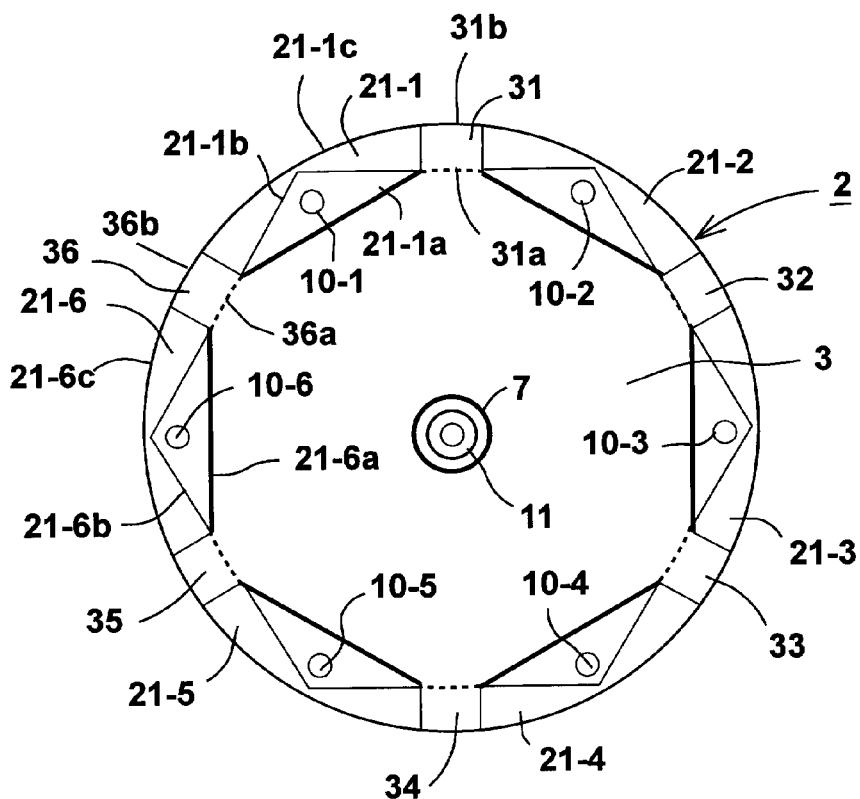
FIG. 2 is a top plan view illustrating the appliance of FIG. 1 with the cover removed.

Thus, the grilling appliance illustrated in FIGS. 1 and 2 includes an electrical supply system which sequentially energizes the circular array of electrical heaters 10 to produce the slowly-rotating heating front, and continuously emergizes electrical heater lamp 11 within the impaling member 7.

The electrical supply system, is schematically indicated by conductor 14 and plug 15 illustrated in FIG. 1. It further includes a heat selector 16 which may be used for manually pre-selecting the amount of heat to be applied by electrical heaters 10 within the grilling compartment 3, and a rotational speed selector 17 for manually pre-selecting the rotational speed of the heating front as it rotates around the food article 4 within the heating compartment. Both the heating control by selector 16, and the speed control by selector 17, operate by controlling the sequential energization of the heater lamps 10.

In the example illustrated in the drawings, there are six electrical heater lamps 10 in the circular array around the food article 4 to be heated, and a seventh heater lamp 11 within the vertical impaling member 7 receiving the food article 4. As indicated earlier, heater lamp 11 is continuously energized, whereas the six heater lamps 10 in the circular array are sequentially energized, under the control of the heat selector 16 and speed selector 17, to produce the desired magnitude of the heating front, and also the desired rotational speed of the heating front, produced by heater lamps 11–15.

In such a control, heater selector 16 may be used to select the number of electrical heater lamps lo which will be energized at one time. In the above-described example, three such heater lamps are energized. If more heat is desired, four lamps could be energized at one time; and if less heat is desired, only two lamps, could be energized at any one time.

The speed selector 17 is used for preselecting the rotational speed of the heating front applied around the food article 4 by the heater lamps lo. Thus, if a faster rotational speed for the heating front is desired, the heating periods could be divided into five second intervals; and if a slower speed is desired for the rotating heating front, the heating period could be divided into fifteen second or twenty second intervals.

It will thus be seen that the magnitude of the heat produced by the heater lamps 10 can be selected by selector 16 to produce the amount of overlapping of the energization of the heating intervals for each lamp; and the rotational speed of the rotating heating front can be selected by selector 17 to select the speed of the sequential energization of the heater lamps 10.

As illustrated in FIG. 2, housing 2 is constructed in the form of a circular array of compartments each of which includes one of the electrical heater lamps 10 in the circular array. The example illustrated in FIG. 2 includes six heater lamps 10-1 to 10-6, and therefore, housing 2 would be divided into six compartments 21-1 to 21-6. These compartments are spaced from each other by housing sections 31–36.

All the housing compartments 21-1 to 21-6 include an inner wall 21-1a to 21-6a made of a heat-resistant transparent material for protecting the heater lamps 10 from splatter from the food article 4 as it is being grilled. Each of these compartments also includes a reflector 21-1b to 21-6b, respectively, for directing the heat from the respective lamp into the grilling compartment 3, and an outer wall 21-1c to 21-6c, respectively, which is preferably non-transparent. The inner and outer walls of the spacing sections 31–36 are preferably transparent, as shown at 31a–36a and 31b–36b, to enable one to see the interior of the grilling compartment 3 from outside.

It will be appreciated that the grilling appliance could include a larger number or a smaller number of electrical heater lamps in the circular array 10. For example, such a grilling appliance could include but four heater lamps, or more than six, depending upon the size of the appliance.

Impaling member 7 preferably includes a ring 7a, projecting from its upper end to facilitate removal of the impaling member, with the grilled food article thereon, by merely grasping the ring and pulling it outwardly.

While the invention has been described with respect to one preferred embodiment, it will be appreciated that this is set forth merely for purposes of example, and that many other variations, modifications and applications of the invention may be made.

What is claimed is:

1. A grilling appliance, comprising:
   a housing defining an internal grilling compartment for receiving a food article to be grilled;
   an impaling member mounted within said grilling compartment for impaling a food article to be grilled;
   a circular array of electrical heaters surrounding said impaling member for heating the food article impaled thereon;
   and an electrical supply system for energizing said electrical heaters;
   characterized in that:
   said impaling member is non-rotatably mounted to said housing within said grilling compartment;
   and said electrical supply system includes a heater control device which sequentially energizes said electrical heaters to produce a rotating heating front which rotates around said impaling member to heat the article impaled thereon.

2. The grilling appliance according to claim 1, wherein said heater control device sequentially energizes said electrical heaters according to preselected time intervals in which the energization time interval of each electrical heater overlaps the energization time interval of the next sequentially-energized electrical heater.

3. The grilling appliance according to claim 2, wherein said heater control device includes a heat selector for selecting the heat intensity of the heating front produced by the electrical heaters by selecting the amount of said overlapping of the energization time intervals.

4. The grilling appliance according to claim 1, wherein said heat control device includes a rotational speed selector for selecting the speed of rotation of said rotating heat front by selecting the speed of sequential energization of the electrical heaters.

5. The grilling appliance according to claim 1, wherein said impaling member includes an electrical heater controlled by said heat control device so as to be continuously energized during the sequential energization of the circular array of electrical heaters.

6. The grilling appliance according to claim 1, wherein said impaling member is mounted vertically over a drip pan within said grilling compartment.

7. The grilling appliance according to claim 1, wherein each of said electrical heaters is a heat lamp.

8. The grilling appliance according to claim 1, wherein said housing is constructed of a circular array of housing compartments each occupied by a said electrical heater.

9. The grilling appliance according to claim 8, wherein said partitions are separated by transparent sections to permit viewing the internal grilling compartment from the outside.

10. The grilling appliance according to claim 1, wherein said housing includes a circular, inner, heat-resistant transparent wall separating said circular array of electrical heaters from said internal grilling compartment.

11. The grilling appliance according to claim 1, wherein said circular array of electrical heaters includes at least four electrical heaters.

12. The grilling appliance according to claim 1, wherein said circular array of electrical heaters includes six electrical heaters.

13. A grilling appliance, comprising:

a housing defining an internal grilling compartment for receiving a food article to be grilled;

a horizontal drip pan mounted within said grilling compartment;

an impaling member mounted vertically centrally of said drip pan for impaling a food article to be grilled;

an internal electrical heater mounted within said impaling member;

a circular array of electrical heaters mounted to said housing around said impaling member for heating the food article impaled thereon;

and an electrical supply system for energizing said electrical heaters;

said impaling member being non-rotatably mounted within said grilling compartment;

said electrical supply system including a heater control device which continuously the energizes said internal heater within said impaling member, and sequentially energizes said circular array of electrical heaters to produce a rotating heating front which rotates around said impaling member to apply heat externally of the article impaled thereon.

14. The grilling appliance according to claim 13, wherein said heater control device sequentially energizes said electrical heaters according to preselected time intervals in which the energization time interval of each electrical heater overlaps the energization time interval of the next sequentially-energized electrical heater.

15. The grilling appliance according to claim 13, wherein said heater control device includes a heat selector for selecting the heat intensity of the heating front produced by the electrical heaters by selecting the amount of said overlapping of the energization time intervals.

16. The grilling appliance according to claim 13, wherein said heat control device includes a rotational speed selector for selecting the speed of rotation of said heat front by selecting the speed of sequential energization of the electrical heaters.

17. The grilling appliance according to claim 13, wherein each of said electrical heaters is a heat lamp.

18. The grilling appliance according to claim 13, wherein said housing is constructed of a circular array of housing compartment each occupied by a said electrical heater.

19. The grilling appliance according to claim 18, wherein said compartments alternate with transparent housing sections to permit viewing the grilling compartment from the outside.

20. The grilling appliance according to claim 13, wherein said housing includes a circular, inner, heat-resistant transparent wall separating said circular array of electrical heaters from said internal grilling compartment.

* * * * *